US010872397B2

(12) United States Patent
Kaneko

(10) Patent No.: US 10,872,397 B2
(45) Date of Patent: Dec. 22, 2020

(54) OPTICAL PATH RADIANCE CORRECTION DEVICE

(71) Applicant: NEC Corporation, Tokyo (JP)

(72) Inventor: Eiji Kaneko, Tokyo (JP)

(73) Assignee: NEC CORPORATION, Tokyo (JP)

( * ) Notice: Subject to any disclaimer, the term of this patent is extended or adjusted under 35 U.S.C. 154(b) by 154 days.

(21) Appl. No.: 16/086,352

(22) PCT Filed: Mar. 21, 2017

(86) PCT No.: PCT/JP2017/011096
§ 371 (c)(1),
(2) Date: Sep. 19, 2018

(87) PCT Pub. No.: WO2017/169946
PCT Pub. Date: Oct. 5, 2017

(65) Prior Publication Data
US 2019/0096048 A1    Mar. 28, 2019

(30) Foreign Application Priority Data

Mar. 30, 2016  (JP) ................................ 2016-068541

(51) Int. Cl.
*G06T 5/00* (2006.01)
(52) U.S. Cl.
CPC .... *G06T 5/002* (2013.01); *G06T 2207/10036* (2013.01)
(58) Field of Classification Search
None
See application file for complete search history.

(56) References Cited

U.S. PATENT DOCUMENTS 7,337,065 B2 *  2/2008  Adler-Golden ...... G06K 9/0063
                                                       702/3
2010/0008595 A1    1/2010  Riley et al.
(Continued)

FOREIGN PATENT DOCUMENTS

JP    2015-32205 A    2/2015
WO    2016/098353 A1  6/2016

OTHER PUBLICATIONS

R. Bird et al., "Simple Solar Spectral Model for Direct and Diffuse Irradiance on Horizontal and Tilted Planes at the Earth's Surface for Cloudless Atmospheres", Journal of Climate and Applied Meteorology, Jan. 1986, vol. 25, pp. 87-97 (total 11 pages).
(Continued)

*Primary Examiner* — Justin P. Misleh

(57) ABSTRACT

An device extracts a luminance that satisfies a rule from among luminance of being observed values of electromagnetic waves in a plurality of wavelength bands different mutually and calculates a first interim optical path radiance based on the luminance. The observed values is associated with each pixel constituting an observation image for each of the wavelength bands. The device calculates a final optical path radiance for each of the wavelength bands by weighting the first and a second interim optical path radiance including information on atmosphere with a weighting coefficient and adding those weighted luminance. The weighting coefficient represents reliability for an assumption of a dark pixel that is a pixel assumed not to be affected by electromagnetic waves reflected by an object. The device subtracts the final optical path radiance from all pixels of the observation image for each of the wavelength bands.

7 Claims, 9 Drawing Sheets

(56) References Cited

U.S. PATENT DOCUMENTS

2012/0154584 A1* 6/2012 Omer ............... H04N 5/23238
348/144
2014/0270332 A1* 9/2014 Pacifici ................ G06T 5/001
382/100

OTHER PUBLICATIONS

Silleos et al., "Vegetation Indices: Advances Made in Biomass Estimation and Vegetation Monitoring in the Last 30 years", Geocarto International, 2006, vol. 21, No. 4, pp. 21-28 (total 9 pages).
Antonio F. Wolf, "Using WorldView-2 Vis-NIR multispectral imagery to support land mapping and feature extraction using normalized difference index ratios", Proceeding of SPIE, SPIE Defense, Security, and Sensing, 2012, vol. 8390, total 9 pages.
Daniel Schläpfer, "MODOTRAN®-5 for Remote Sensing Applications User Manual, Version 5", ReSe, 2011, total 96 pages.
International Search Report dated May 30, 2017, issued by the International Searching Authority in application No. PCT/JP2017/011096.
Written Opinion dated May 30, 2017, issued by the International Searching Authority in application No. PCT/JP2017/011096 [PCT/ISA/237].

* cited by examiner

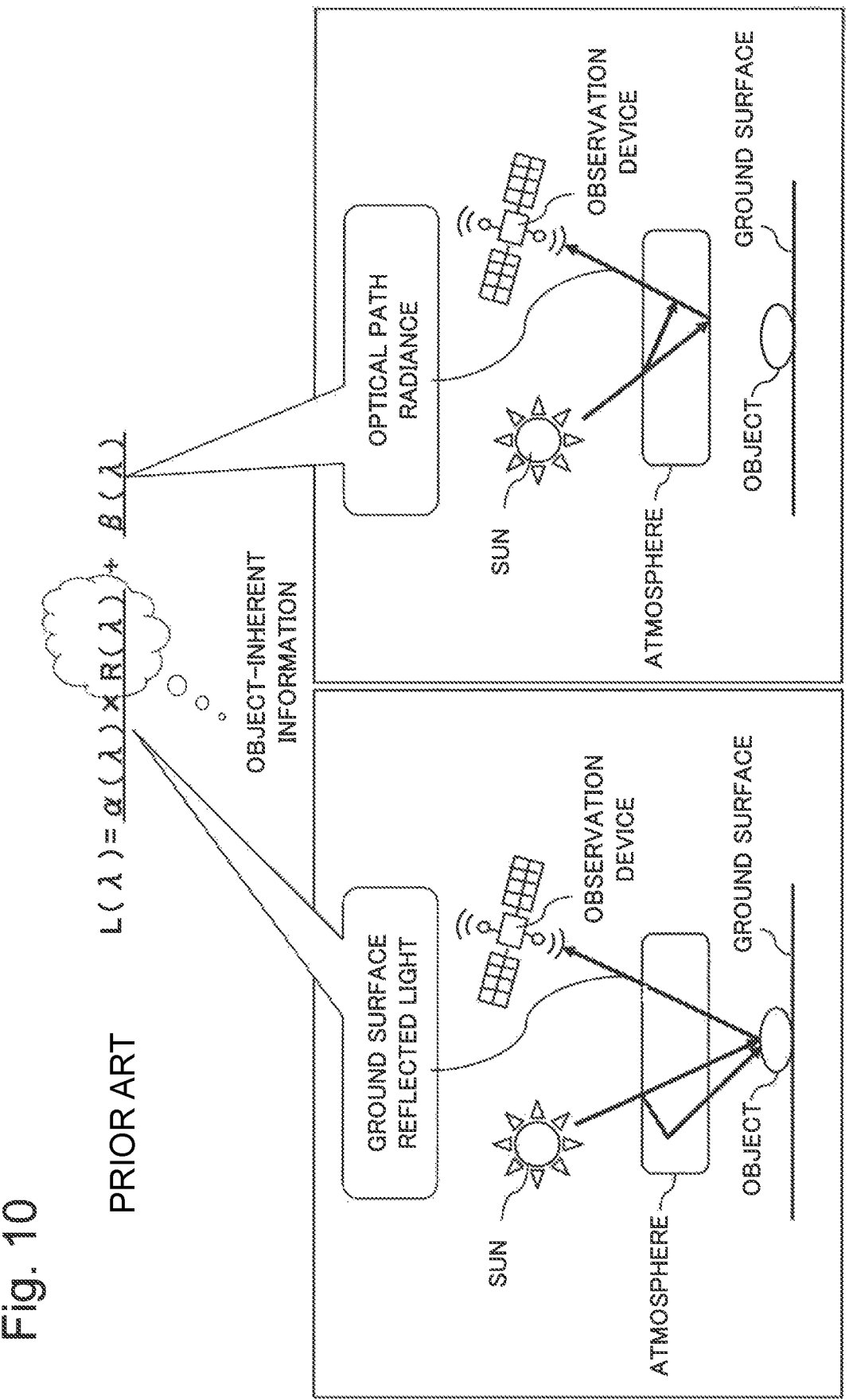

OPTICAL PATH RADIANCE CORRECTION DEVICE

This application is a National Stage Entry of PCT/JP2017/011096 filed on Mar. 21, 2017, which claims priority from Japanese Patent Application 2016-068541 filed on Mar. 30, 2016, the contents of all of which are incorporated herein by reference, in their entirety.

TECHNICAL FIELD

The present invention relates to a technique for correcting information included in an observation image.

BACKGROUND ART

A technique for observing a ground surface by an observation device such as an artificial satellite or an airplane from a high altitude is referred to as remote sensing. In remote sensing, an intensity of electromagnetic waves such as light irradiated from an area of a predetermined range of a ground surface is observed in many cases. An observation result acquired by remote sensing is frequently represented as pixel values associated with an image. In other words, the pixel values are data associated with pixels corresponding to a position on a ground surface of an observed area, in an image. When, for example, the observation device is an image sensor, an observation result is acquired as an image. A pixel value included in the image is a value depending on an intensity of light (observation light) entering a light receiving element of the image sensor.

Note that, when a pixel value is a value representing brightness of observed light, a value representing the brightness of the observation light is also described as a luminance, instead of a pixel value. Further, observation is frequently performed by using a filter through which light of a wavelength included in a wavelength band of a specified range is selectively transmitted. A plurality of filters having different wavelength bands of transmitted light are used, and thereby an intensity of observation light for each of a plurality of wavelength bands is acquired as an observation result.

Further, it is known that an object reflects light of an intensity different with respect to each wavelength, depending on material quality and a state of a surface of the object. A reflectance of light with respect to each wavelength in an object is referred to as a surface reflectance. The surface reflectance of the object can be calculated based on a luminance associated with each pixel of an image acquired by remote sensing. An application (applied technique) for acquiring based on information of the surface reflectance of the object, a state and material quality of the object has been expected. As a field to which such an application is applied, there are agricultural management support and resource exploration.

In agricultural management support and resource exploration, by using a luminance (in other words, a surface reflectance of an object) with respect to each wavelength band associated with each pixel of an image, it is expected that a degree of growth of an agricultural crop is acquired and a mineral is discriminated. In order to realize exact agricultural management support and resource exploration, it is necessary to acquire accurate information of a ground surface object such as an agricultural crop and a mineral.

Note that, PTL 1 discloses a technique for removing an influence of an atmosphere by correcting a radiation luminance measured by a spectrum sensor.

CITATION LIST

Patent Literature

[PTL 1] Japanese Unexamined Patent Application Publication No. 2015-32205

SUMMARY OF INVENTION

Technical Problem

An observed value (luminance) acquired as an image by remote sensing is affected by not only surface reflection light by an observation target but also brightness of solar light, absorption of light by an atmosphere, and scattering of light by an atmosphere. Therefore, the observed value (luminance) is represented by equation (1) including, in addition to a surface reflectance possessed by an observation target object, a component depending on brightness of solar light and a transmittance of an atmosphere, and a component of light that is scattered by the atmosphere and enters a sensor.

$$L(\lambda) = \alpha(\lambda) \times R(\lambda) + \beta(\lambda) \tag{1}$$

$L(\lambda)$ in equation (1) represents a luminance of observation light at a wavelength $\lambda$. $R(\lambda)$ represents a surface reflectance of a ground surface object at the wavelength $\lambda$. $\alpha(\lambda)$ represents a component (coefficient component) relating to brightness of solar light and an atmospheric transmittance at the wavelength $\lambda$. $\beta(\lambda)$ represents a component (addition component) relating to a luminance of light (scattered light) at the wavelength $\lambda$, in which solar light is scattered in an atmosphere and reaches a sensor without passing through the ground surface object. Note that, a luminance of light (scattered light) in which solar light is scattered in an atmosphere and reaches a sensor without passing through a ground surface object is also described as an optical path radiance.

A relation between the luminance $L(\lambda)$ of observation light and the surface reflectance $R(\lambda)$ of a ground surface object, being represented by equation (1), is established with respect to an observed value which is observed in any wavelength band. The coefficient component $\alpha(\lambda)$ and the addition component $\beta(\lambda)$, being represented in equation (1), are so-called environmental noise. FIG. 10 is a diagram illustrating, by using an image, a relation between a luminance $L(\lambda)$ of observation light, and a surface reflectance $R(\lambda)$ of a ground surface object and environmental noise, in an observation image based on high altitude image capturing.

Incidentally, the environmental noise (i.e. brightness of solar light, a transmittance of an atmosphere, and brightness (optical path radiance) of scattered light by the atmosphere) varies depending on an environmental change such as a change of a solar altitude due to diurnal motion or fluctuations of an atmosphere. Therefore, in order to acquire accurate information of a ground surface object, it is necessary to estimate the environmental noise during observation, and correct a component of the environmental noise depending on the environmental change. In other words, the addition component $\beta(\lambda)$ is estimated and the estimated addition component $\beta(\lambda)$ is subtracted from equation (1), and thereby a corrected optical path radiance $L'(\lambda)$ represented in equation (2) is acquired.

$$L'(\lambda) = \alpha(\lambda) \times R(\lambda) \tag{2}$$

However, an optical path is complex, and therefore, a problem that it is difficult to acquire an accurate optical path radiance occurs.

The present invention is conceived in order to solve the above-described problem. In other words, a main object of the present invention is to provide a technique for improving correction accuracy of an optical path radiance.

Solution to Problem

To achieve the object mentioned above, an embodiment of an information processing device includes:

a first interim optical path radiance calculation unit that extracts a luminance that satisfies a preset rule from among luminance of being observed values of electromagnetic waves in a plurality of wavelength bands different mutually and calculates a first interim optical path radiance based on the luminance, the observed values being associated with each pixel constituting an observation image for each of the wavelength bands, the observation image being acquired by observing the electromagnetic waves which pass through an atmosphere;

a second interim optical path radiance calculation unit that calculates a second interim optical path radiance that includes information on a state of the atmosphere;

a final optical path radiance calculation unit that calculates a final optical path radiance for each of the wavelength bands by weighting the first interim optical path radiance and the second interim optical path radiance with a weighting coefficient and adds the weighted first interim optical path radiance and the weighted second interim optical path radiance, the weighting coefficient representing reliability for an assumption of a dark pixel that is a pixel assumed not to be affected by electromagnetic waves reflected by an object in pixels of the observation image; and an optical path radiance correction unit that subtracts the final optical path radiance from all pixels of the observation image for each of the wavelength bands.

An embodiment of an information processing system includes:

the information processing device mentioned above; and an image supply device that supplies, to the information processing device, an observation image for each wavelength band being acquired by observing electromagnetic waves of a plurality of wavelength bands different mutually passing through an atmosphere.

An embodiment of an information processing method includes:

extracting a luminance that satisfies a preset rule from among luminance of being observed values of electromagnetic waves in a plurality of wavelength bands different mutually and calculating a first interim optical path radiance based on the luminance, the observed values being associated with each pixel constituting an observation image for each of the wavelength bands, the observation image being acquired by observing the electromagnetic waves which pass through an atmosphere;

calculating a second interim optical path radiance that includes information on a state of the atmosphere;

calculating a final optical path radiance for each of the wavelength bands by weighting the first interim optical path radiance and the second interim optical path radiance with a weighting coefficient and adding the weighted first interim optical path radiance and the weighted second interim optical path radiance, the weighting coefficient representing reliability for an assumption of a dark pixel that is a pixel assumed not to be affected by electromagnetic waves reflected by an object in pixels of the observation image; and subtracting the final optical path radiance from all pixels of the observation image for each of the wavelength bands.

An embodiment of a program storage medium stores a computer program representing a processing procedure that causes a computer to execute:

extracting a luminance that satisfies a preset rule from among luminance of being observed values of electromagnetic waves in a plurality of wavelength bands different mutually and calculating a first interim optical path radiance based on the luminance, the observed values being associated with each pixel constituting an observation image for each of the wavelength bands, the observation image being acquired by observing the electromagnetic waves which pass through an atmosphere;

calculating a second interim optical path radiance that includes information on a state of the atmosphere;

a final optical path radiance for each of the wavelength bands by weighting the first interim optical path radiance and the second interim optical path radiance with a weighting coefficient and adding the weighted first interim optical path radiance and the weighted second interim optical path radiance, the weighting coefficient representing reliability for an assumption of a dark pixel that is a pixel assumed not to be affected by electromagnetic waves reflected by an object in pixels of the observation image; and subtracting the final optical path radiance from all pixels of the observation image for each of the wavelength bands.

Note that, the main object of the present invention is also achieved by an information processing method according to the present invention corresponding to the information processing device according to the present invention. Further, the main object of the present invention is also achieved by a computer program according to the present invention and a storage medium storing the program, corresponding to the information processing device according to the present invention and the information processing method according to the present invention.

Advantageous Effects of Invention

According to the present invention, correction accuracy of an optical path radiance can be improved.

BRIEF DESCRIPTION OF DRAWINGS

FIG. 10 is a diagram illustrating, by using an image, a relation among a luminance of observation light, a surface reflectance of a ground surface object, and environmental noise.

EXAMPLE EMBODIMENT

First, one configuration example of an information processing device proposed by the present inventor is described.

The information processing device proposed by the present inventor includes a function of calculating an optical path radiance using an observation image that includes information on the optical path radiance and, correcting the calculated optical path radiance. Particularly, the proposed information processing device detects an interim optical path radiance $\beta^W(\gamma)$, with respect to the observation image in a wavelength band $\gamma$. The interim optical path radiance $\beta^W(\gamma)$ is a minimum luminance having a minimum value among luminance associated with all pixels constituting the observation image, respectively. Then, the proposed information processing device calculates a true value Xe of an atmosphere state parameter representing an atmosphere state by using the interim optical path radiance $\beta^W(\gamma)$. Further, the proposed information processing device substitutes the calculated true value Xe of the atmosphere state parameter into a parameter X in a mathematical equation for calculating an optical path radiance $\beta^M(\gamma, X)$ considering an atmosphere state parameter X, and thereby calculates a final optical path radiance $\beta^M(\gamma, Xe)$.

In the following description, a mathematical equation for calculating the optical path radiance of the wavelength band $\gamma$ by considering the atmosphere state parameter X is referred to as an optical path radiance model, and is represented as $\beta^M(\gamma, X)$.

Figure 4:
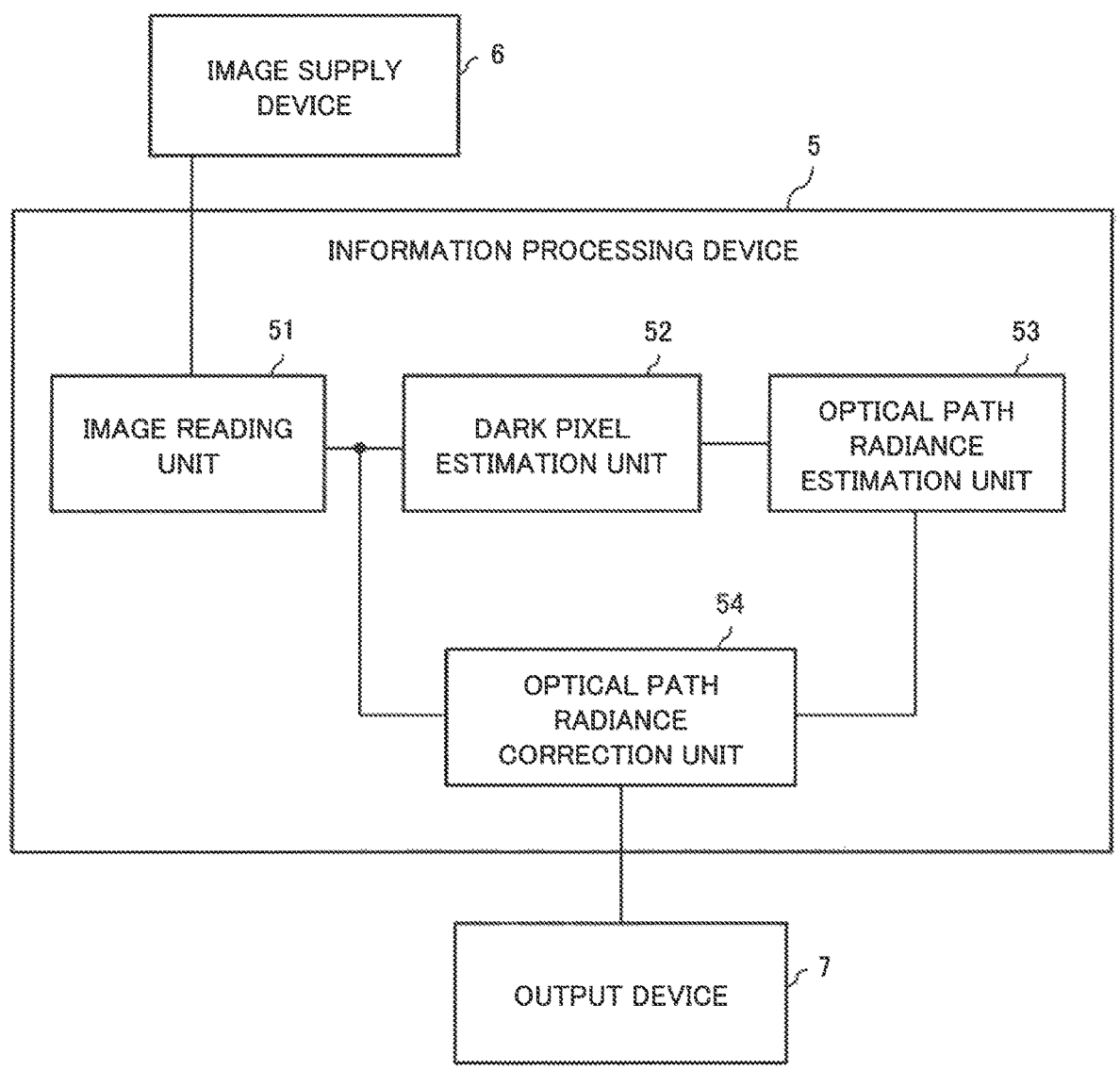
FIG. 4 is a block diagram illustrating a configuration of an information processing device and an information processing system that are proposed.

FIG. 4 is a block diagram illustrating one configuration example of the proposed information processing device which described above. An information processing device 5 in FIG. 4 includes an image reading unit 51, a dark pixel estimation unit 52, an optical path radiance estimation unit 53 and an optical path radiance correction unit 54. The image reading unit 51 includes a function of reading an observation image from an image supply device 6. The dark pixel identification unit 52 includes a function of detecting a minimum luminance from the read observation image for each wavelength band. Herein, it is assumed that a minimum luminance in a wavelength band $\gamma$ is a calculated value $\beta^W(\gamma, X)$ of the interim optical path radiance.

The optical path radiance estimation unit 53 includes a function of calculating the true value Xe of the atmosphere state parameter, by using the interim optical path radiance $\beta^W(\gamma)$ calculated by the dark pixel estimation unit 52 and the optical path radiance model $\beta^M(\gamma, X)$ in which a value changes in response to a change of a value of the atmosphere state parameter X. In other words, the optical path radiance estimation unit 53 calculates a cost, based on the optical path radiance model $\beta^M(\gamma, X)$ at the value of each atmosphere state parameter X and the interim optical path radiance $\beta^W(\gamma)$, while changing the value of the atmosphere state parameter X. The cost herein is a value representing a degree of deviation between the optical path radiance model $\beta^M(\gamma, X)$ and the interim optical path radiance $\beta^W(\gamma)$.

Then, the optical path radiance estimation unit 53 sets the value of the atmosphere state parameter X in which the cost is minimum, as the true value Xe of the atmosphere state parameter. Further, the optical path radiance estimation unit 53 sets, as a final optical path radiance $\beta^E(\gamma)$, the value $\beta^M(\gamma, Xe)$ acquired by substituting the calculated value (true value) Xe into the atmosphere state parameter X of the optical path radiance model $\beta^M(\gamma, X)$.

The optical path radiance correction unit 54 corrects the optical path radiance by subtracting the final optical path radiance $\beta^E(\gamma)$ calculated by the optical path radiance estimation unit 53 from a luminance $L(\gamma)$ in all pixels of the observation image, and outputs the corrected information to an output device 7.

The information processing device 5 includes a configuration as described above, and thereby can correct the optical path radiance of information included in the observation image, and can output the corrected information. However, due to an influence of an error included in the optical path radiance model $\beta^M(\gamma, X)$, a difference between the optical path radiance model $\beta^M(\gamma, X)$ and a true optical path radiance may increase beyond an allowable value even when any value of the parameter X is selected. In this case, the final optical path radiance $\beta^E(\gamma)$ is not accurately matched with the true optical path radiance, and therefore the information processing device 5 produces a problem that it is difficult to accurately correct the optical path radiance.

Therefore, the present inventor has studied out the present invention in order to accurately correct the optical path radiance, even when the optical path radiance model for calculating the optical path radiance includes the error.

Hereinafter, example embodiments according to the present invention are described with reference to the drawings.

First Example Embodiment

Figure 1:
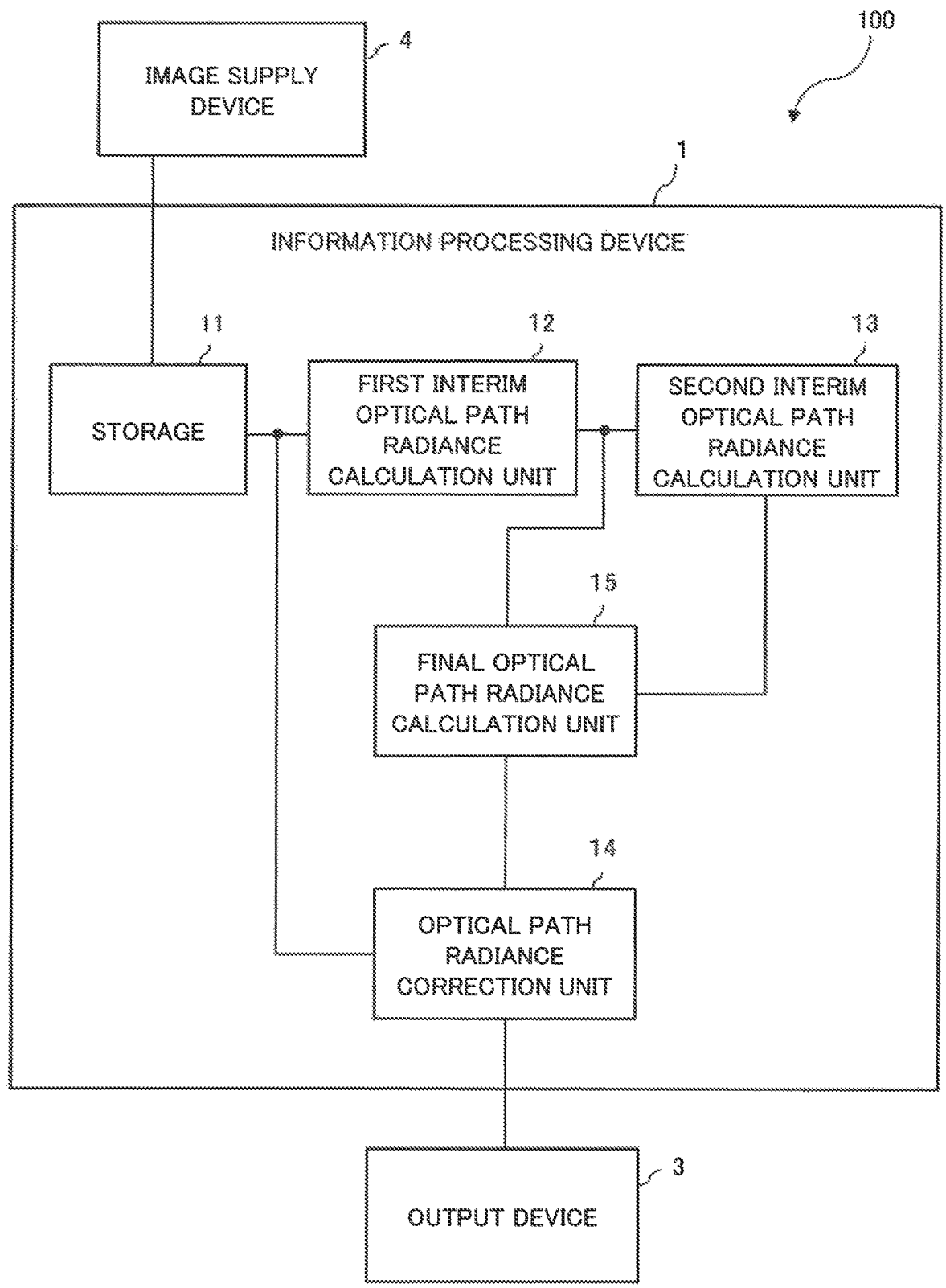
FIG. 1 is a block diagram simply illustrating a configuration of an information processing device and an information processing system of a first example embodiment according to the present invention.

FIG. 1 is a block diagram simply illustrating a configuration of an information processing device and an information processing system including the device of a first example embodiment according to the present invention. An information processing system 100 according to the first example embodiment roughly includes an information processing device 1, an image supply device 4, and an output device 3. The information processing device 1 is communicably connected to the image supply device 4 and the output device 3.

The image supply device 4 is, for example, an image capture device that observes an intensity of electromagnetic waves reflected on an observation target with respect to a plurality of wavelength bands different mutually, and outputs the observed result as the observation image. Alternatively, the image supply device 4 may be a storage device such as a hard disk and the like, a server device, and the like that stores the observation image that is a result acquired through observation by such the image capture device.

Note that in the following description, N (N is an integer equal to or more than 2) is the number of wavelength bands of electromagnetic waves from which the image supply device 4 observes the observation target.

The image supply device 4 includes a function of supplying N observation images associated with wavelength bands to the information processing device 1. The image supply device 4 may supply, to the information processing device 1, not only N observation images but also a center wavelength representing a wavelength band or an upper limit value and a lower limit value of a wavelength band associated with each observation image.

For example, when the observation target is a ground surface, the image supply device 4 is mounted on an airplane or an artificial satellite, and observes reflected light which is reflected on the ground surface, from the sky, as a part of observation light in a plurality of wavelength bands different from one another. A specific example is cited as follows: the image supply device 4 is a camera and captures observation lights of N wavelength bands having passed through a bandpass filter through which light of any of N wavelength bands different from one another is selectively transmitted. Then, the image supply device 4 outputs N captured images (observation results) as observation images, respectively. Note that the image supply device 4 may observe a distant ground surface from a ground surface or a close point of the ground surface, instead of observing a ground surface from the sky. Further, widths of N wavelength bands may not necessarily be uniform.

N observation images output from the image supply device 4 are images representing a brightness distribution of the observation target observed for any of N wavelength bands different from one another. In each observation image, a luminance of each pixel constituting the observation image represents an intensity of observation light having arrived from a direction corresponding to the pixel. Note that in the first example embodiment, N observation images are, for example, images acquired by observing the same observation target, but may be images acquired by observing different observation targets. However, this case corresponds to a case in which values of optical path radiance are the same or substantially the same with respect to all observation areas of respective images. When N observation images acquired by observing different observation targets are used, for example, a system administrator selects N images.

The output device 3 is, for example, a display device. Further, the output device 3 may be, for example, an object identification device that extracts information representing material quality or a state of an image-captured object from an observation image.

The information processing device 1 includes a storage 11, a first interim optical path radiance calculation unit 12, a second interim optical path radiance calculation unit 13, an optical path radiance correction unit 14, and a final optical path radiance calculation unit 15.

The storage 11 is a storage device such as a magnetic disk, a semiconductor memory, and the like. The storage 11 stores N observation images supplied from the image supply device 4, in association with information of a wavelength band in which the images are observed. Information of the wavelength band associated with the observation images, for example, may be the center wavelength representing the wavelength band or a combination of the upper limit value and the lower limit value of the wavelength band, or may be an identifier assigned to each wavelength band.

The first interim optical path radiance calculation unit 12, the second interim optical path radiance calculation unit 13, the optical path radiance correction unit 14, and the final optical path radiance calculation unit 15 each may be an electronic circuit or may be realized by a computer program and a processor that operates in accordance with the computer program.

The first interim optical path radiance calculation unit 12 includes a function of detecting, as a first interim optical path radiance, a luminance of the pixel in which the luminance satisfies a rule among all pixels constituting the observation image associated with each of N wavelength bands stored on the storage 11. For example, the first interim optical path radiance calculation unit 12 detects a minimum luminance among luminance of all pixels as the luminance that satisfies the rule. Further, the first interim optical path radiance calculation unit 12 may detect, as the luminance that satisfies the rule, a luminance of an order that is a multiplied value in which the total number of pixels is multiplied by a predetermined ratio, when luminance of all pixels are arranged in ascending order.

In the following description, a pixel corresponding to the luminance detected by the first interim optical path radiance calculation unit 12 is referred to as a dark pixel. The dark pixel is a pixel assumed in such a way that a surface reflectance can be regarded as being zero with respect to a dark area of a ground surface to be observed. Further, an i-th (i is any integer from 1 to N) wavelength band in N wavelength bands is represented as $\gamma_i$. Further, a luminance of the dark pixel detected in N wavelength bands $\gamma_i$ is represented as the first interim optical path radiance $\beta^D(\gamma_i)$.

The second interim optical path radiance calculation unit 13 includes a function of calculating a second interim optical path radiance $\beta^E(\gamma_i)$ by using the first interim optical path radiance $\beta^D(\gamma_i)$ calculated by the first interim optical path radiance calculation unit 12.

In the following description, X used for an optical path radiance model $\beta^M(\gamma_i, X)$, used in a process in which the second interim optical path radiance calculation unit 13 calculates the second interim optical path radiance $\beta^E(\gamma_i)$, represents a set of Q atmosphere state parameters Xj (j is any integer from 1 to Q) representing a state of an atmosphere. The atmosphere state parameter Xj represents information relating to particles (particles including molecules, aerosol, sands, soot, and the like) included in an atmosphere. In other words, the atmosphere state parameter Xj is, for example, an angstrom index, a degree of atmospheric turbidity, an atmospheric transmittance, an optical thickness of atmospheric molecules, an optical thickness of aerosol, a visibility range, or a value calculated by using these factors.

Specific examples of the optical path radiance model $\beta^M(\gamma_i, X)$ are represented in equation (3) to equation (5). In equation (3) to equation (5), an irradiance based on solar light in N wavelength bands $\gamma_i$ is represented as $I(\gamma_i)$.

$$\beta^M(\gamma_i, X_1, X_2) = X_1 \times I(\gamma_i) \times \gamma_i^{-X_2} \tag{3}$$

$$\beta^M(\gamma_i, X_1, X_2, X_3) = X_1 \times I(\gamma_i) \times \left(1 - e^{-X_2 \times \gamma_i^{-X_3}}\right) \tag{4}$$

$$\beta^M(\gamma_i, X_1, X_2, X_3, X_4) = X_1 \times I(\gamma_i) \times \left(1 - e^{-\left(X_2 \times \gamma_i^{-X_3} + X_4 \times \tau(\lambda)\right)}\right) \tag{5}$$

For example, the second interim optical path radiance calculation unit 13 uses, as the irradiance $I(\gamma_i)$, a standard irradiance based on solar light in N wavelength bands $\gamma_i$. Further, the second interim optical path radiance calculation unit 13 may acquire information on an observation environment from an external device, and may calculate the irradiance $I(\gamma_i)$ by using a physical model representing the irradiance described in following reference document 1. The information on the observation environment is, for example, information including a solar altitude during observation, an observation date, an observation time, a latitude and a longitude of an observation target area, a geographical feature of the observation target area, a water vapor amount and an aerosol amount during observation, and the like.

[Reference Document 1]: R. E. Bird and C. Riordan, "Simple Solar Spectral Model for Direct and Diffuse Irradiance on Horizontal and Tilted Planes at the Earth's Surface for Cloudless Atmospheres", Journal of Climatology and Applied Meteorology, Vol. 25, pp. 87-97

The second interim optical path radiance calculation unit 13 calculates, by using the physical model as described above, direct sunlight and atmospheric scattered light via simulation by using a parameter representing the state of the atmosphere and a solar zenith angle calculated from a location and a time. Thereby, the second interim optical path radiance calculation unit 13 can calculate, for example, a spectral irradiance of solar light in a clear weather with respect to each wavelength. When the physical model is used, first, the parameter having a small influence on the simulation result is set. Next, the second interim optical path radiance calculation unit 13 uses a value representing a solar zenith angle and the state of the atmosphere in the set value of the parameter and information on the observation environment, and calculates the spectral irradiance that is an irradiance per unit wavelength of solar light in a clear weather. Then, the second interim optical path radiance calculation unit 13 adds the spectral irradiance of solar light in a clear weather for a plurality of wavelengths in the wavelength band $\gamma_i$. Thereby, the second interim optical path radiance calculation unit 13 calculates an irradiance $I(\gamma_i)$ for each of N wavelength bands $\gamma_i$.

The second interim optical path radiance calculation unit 13 calculates the second interim optical path radiance $\beta^E(\gamma_i)$, for example, as follows, by using the first interim optical path radiance $\beta^D(\gamma_i)$ calculated by the first interim optical path radiance calculation unit 12. In other words, first, the second interim optical path radiance calculation unit 13 calculates the true value Xe of the atmosphere state parameter of the optical path radiance model $\beta^M(\gamma_i, X)$, by using the first interim optical path radiance $\beta^D(\gamma_i)$. Specifically, for example, the second interim optical path radiance calculation unit 13 calculates the cost C by using the optical path radiance model $\beta^M(\gamma_i, X)$ at each value of X and the first interim optical path radiance $\beta^D(\gamma_i)$ while changing the value of an atmosphere state parameter X. The cost C is a value representing a degree of deviation between the first interim optical path radiance $\beta^D(\gamma_i)$ and an actual optical path radiance during observation. Equation (6) is one example of a mathematical equation for calculating a cost C.

$$C(X_1, \ldots, X_Q) = \Sigma_{i=1}^{N}(\beta^D(\gamma_i) - \beta^M(\gamma_i, X_1, \ldots, X_M))^2 \qquad (6)$$

The second interim optical path radiance calculation unit 13 calculates the atmosphere state parameter X in which the cost C is minimum as the true value Xe of the atmosphere state parameter.

After calculating the true value Xe of the atmosphere state parameter, the second interim optical path radiance calculation unit 13 substitutes the calculated value (true value) Xe into the atmosphere state parameter X in the optical path radiance model $\beta^M(\gamma_i, X)$ and calculates the second interim optical path radiance $\beta^E(\gamma_i)$.

The final optical path radiance calculation unit 15 includes a function of calculating a final optical path radiance $\beta^F(\gamma_i)$ by using the first interim optical path radiance $\beta^D(\gamma_i)$ calculated by the first interim optical path radiance calculation unit 12 and the second interim optical path radiance $\beta^E(\gamma_i)$ calculated by the second interim optical path radiance calculation unit 13.

The final optical path radiance calculation unit 15 weights and adds the first interim optical path radiance $\beta^D(\gamma_i)$ and the second interim optical path radiance $\beta^E(\gamma_i)$ by using a mathematical equation represented in equation (7), and thereby calculates the result as the final optical path radiance $\beta^F(\gamma_i)$. In equation (7), $a(\gamma_i)$ is a weighting coefficient representing reliability for an assumption of the dark pixel with respect to each wavelength band $\gamma_i$. In the following description, $a(\gamma_i)$ is referred to also as a dark pixel assumption reliance coefficient.

$$\beta^F(\gamma_i) = \alpha(\gamma_i) \times \beta^D(\gamma_i) + (1 - \alpha(\gamma_i)) \times \beta^E(\gamma_i) \qquad (7)$$

For example, in the dark pixel assumption reliance coefficient $\alpha(\gamma_i)$, any value from 0 to 1 is set. It is assumed that, for example, the observation image acquired by observing eight wavelength bands is supplied from the image supply device 4 to the information processing device 1. It is assumed that center wavelengths of wavelength bands $\gamma_1, \gamma_2, \gamma_3, \gamma_4, \gamma_5, \gamma_6, \gamma_7,$ and $\gamma_8$ in this case are 425 nm, 480 nm, 545 nm, 605 nm, 725 nm, 832.5 nm, and 905 nm, respectively. In this case, for dark pixel assumption reliance coefficients $a(\gamma_1), a(\gamma_2), a(\gamma_3), a(\gamma_4), a(\gamma_5), a(\gamma_6), a(\gamma_7),$ and $a(\gamma_8)$, for example, 1, 1, 0, 0, 0, 0, 0, 1 are set, respectively. The final optical path radiance calculation unit 15 calculates the final optical path radiance $\beta^F(\gamma_i)$ by using weighting coefficients set in such a way, the first interim optical path radiance $\beta^D(\gamma_i)$, the second interim optical path radiance $\beta^E(\gamma_i)$, and equation (7).

The optical path radiance correction unit 14 includes a function of subtracting, by using the observation image stored on the storage 11 and the final optical path radiance $\beta^F(\gamma_i)$ calculated by the final optical path radiance calculation unit 15, the final optical path radiance from luminance associated with all pixels of the observation image, respectively, with respect to each wavelength band. The optical path radiance correction unit 14 outputs an image corrected by the subtraction to the output device 3 as an optical path radiance correction image. In other words, the subtracted observation image is an image (optical path radiance correction image) in which a component of the optical path radiance calculated by the final optical path radiance calculation unit 15 is excluded from the observation image stored on the storage 11.

Note that in the first example embodiment, for the second interim optical path radiance, the final optical path radiance, and the optical path radiance model, N wavelength bands $\gamma_i$ associated with the observation image are considered, but the optical path radiance and the optical path radiance model in any number of wavelength bands in any range may be employable. In this case, by using the optical path radiance or the optical path radiance model in a preset number of wavelength bands in a set range, the optical path radiance for each of N wavelength bands $\gamma_i$ associated with the observation image is calculated.

Figure 2:
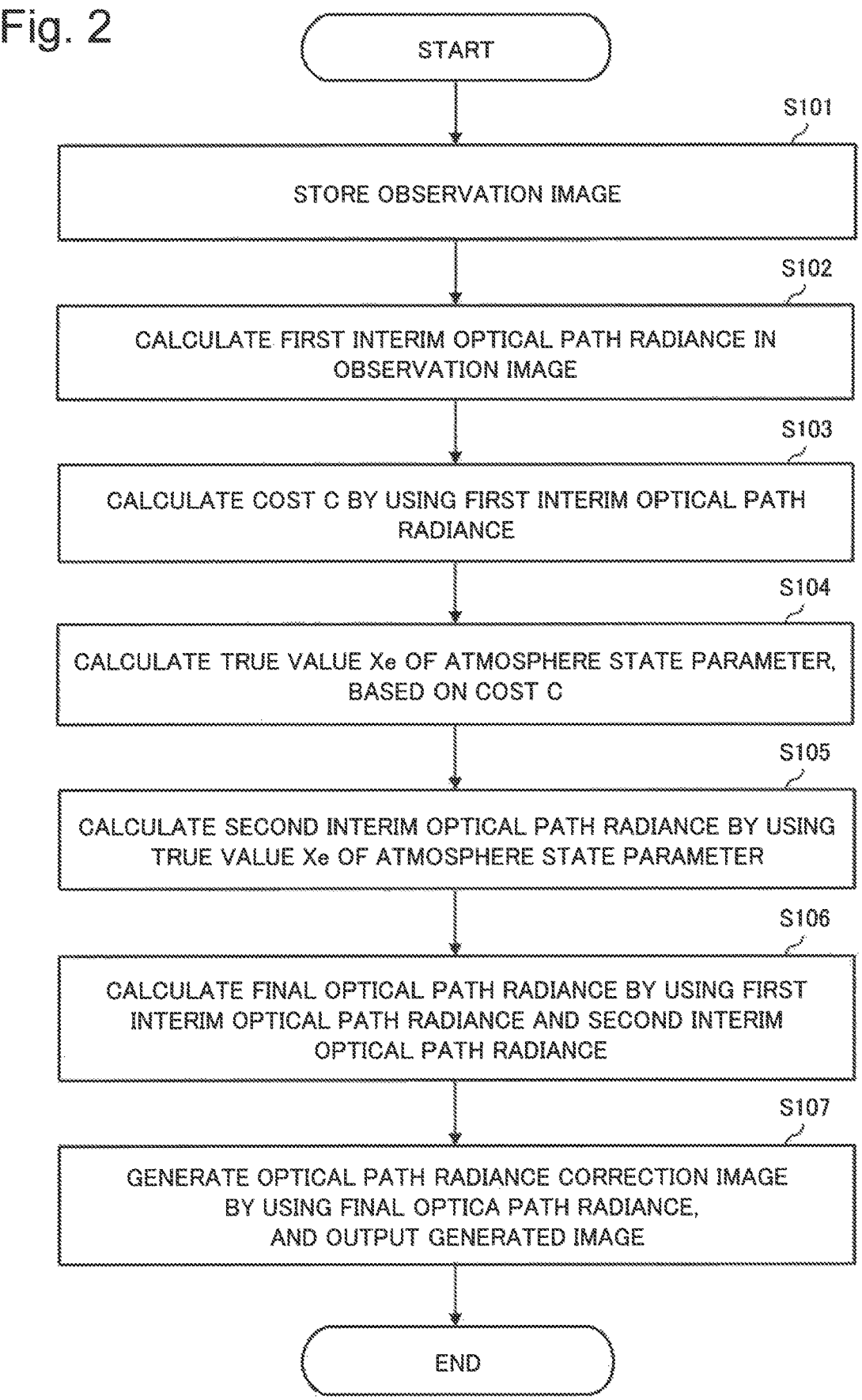
FIG. 2 is a flowchart illustrating an operation example of the information processing device of the first example embodiment.

Next, with reference to a flowchart of FIG. 2, an operation of the information processing device 1 of the information processing system 100 according to the first example embodiment is described.

First, the storage 11 stores N observation images supplied from the image supply device 4 in association with information of the wavelength band in which the observation images are observed (step S101).

The first interim optical path radiance calculation unit 12 detects, as the first interim optical path radiance, the luminance of the dark pixel (the pixel in which the luminance satisfies the rule) among all pixels with respect to the observation image associated with each wavelength band (step S102).

The second interim optical path radiance calculation unit 13 calculates, while changing the value X of the atmosphere state parameter in the optical path radiance model, the optical path radiance based on the optical path radiance model, and calculates the cost C representing the degree of deviation between each calculated optical path radiance and the first interim optical path radiance (step S103).

The second interim optical path radiance calculation unit 13 sets the atmosphere state parameter in which the cost C is minimum as the true value Xe of the atmosphere state parameter (step S104).

Then, the second interim optical path radiance calculation unit 13 substitutes the true value Xe of the atmosphere state parameter into the atmosphere state parameter X of the optical path radiance model and calculates the second interim optical path radiance (step S105)

The final optical path radiance calculation unit 15 weights and adds the first interim optical path radiance according to the first interim optical path radiance calculation unit 12 and the second interim optical path radiance according to the second interim optical path radiance calculation unit 13, by using the weighting coefficient representing reliability for the dark pixel assumption. Thereby, the final optical path radiance calculation unit 15 calculates the final optical path radiance (step S106).

The optical path radiance correction unit 14 generates the optical path radiance correction image by subtracting the final optical path radiance from all pixels of the observation image stored on the storage 11. The optical path radiance correction unit 14 outputs the optical path radiance correction image to the output device 3 (step S107).

The information processing device 1 and the information processing system 100 according to the first example embodiment can accurately calculate the optical path radiance, even when the optical path radiance model used for optical path radiance calculation includes an error. The reason is that the final optical path radiance calculation unit 15 weights and adds the first interim optical path radiance according to the first interim optical path radiance calculation unit 12 and the second interim optical path radiance according to the second interim optical path radiance calculation unit 13, by using the weighting coefficient representing reliability for the dark pixel assumption. Thereby, the final optical path radiance calculation unit 15 calculates the final optical path radiance.

In other words, the information processing device 5 proposed by the inventor, illustrated in FIG. 4, sets the minimum luminance of each observation image as the interim optical path radiance, as described above. Then, the information processing device 5 calculates the true value of the atmosphere state parameter by using the interim optical path radiance and the optical path radiance model, and calculates the final optical path radiance by substituting the calculated true value into the optical path radiance model. However, when the optical path radiance model used for the optical path radiance calculation includes an error, even when any value of the atmosphere state parameter is substituted, it is difficult for the optical path radiance model to accurately calculate the optical path radiance. In this case, the final optical path radiance is not accurately matched with the optical path radiance, and therefore it is difficult for the information processing device 5 to accurately calculate the optical path radiance.

In contrast, the information processing device 1 and the information processing system 100 according to the first example embodiment can set, as the final optical path radiance, the value close to the first interim optical path radiance calculated based on the dark pixel assumption in the wavelength band in which reliability for the dark pixel assumption is high. As a result, even when the optical path radiance model used for optical path radiance calculation includes the error, it is possible to reduce an influence of the error included in the optical path radiance model and accurately calculate the optical path radiance.

Note that each functional unit configuring the information processing device 1 of the first example embodiment can be realized by dedicated hardware (electronic circuit). Further, at least the first interim optical path radiance calculation unit 12, the second interim optical path radiance calculation unit 13, the optical path radiance correction unit 14, and the final optical path radiance calculation unit 15 are conceivable as a functional (processing) unit (software module) of a software program. However, these functional units represent a configuration for convenience of description, and upon actual implementation, various configurations are assumable. One example of a hardware environment that realizes the information processing device 1 of the first example embodiment is described with reference to FIG. 3.

Figure 3:
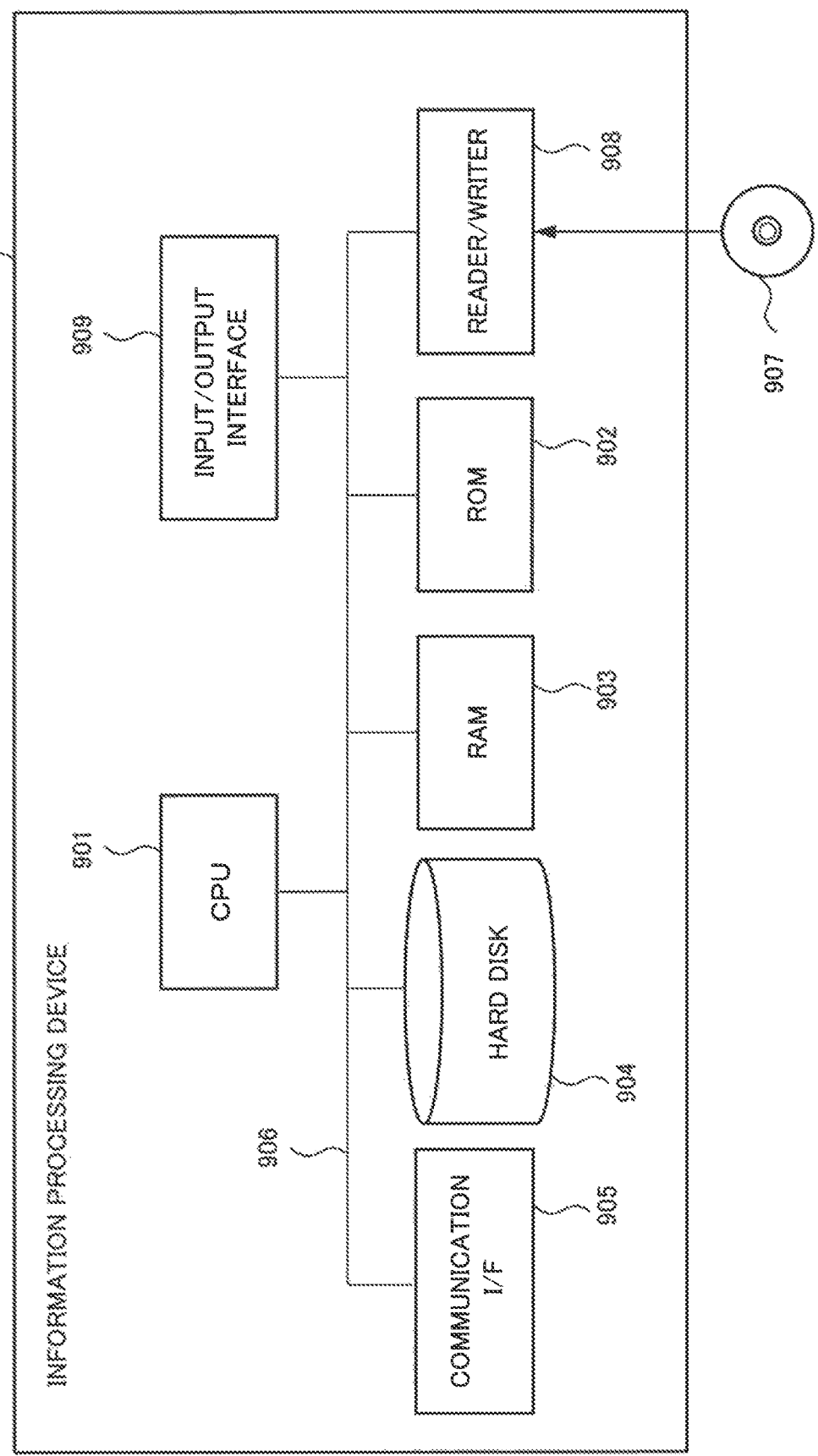
FIG. 3 is a diagram illustrating one configuration example of hardware that realizes the information processing device.

FIG. 3 is a diagram exemplarily illustrating a configuration of an information processing device (computer) capable of operating the information processing device 1 of the first example embodiment. The information processing device 1 in FIG. 3 includes the following as components.

CPU (Central Processing Unit) 901
ROM (Read Only Memory) 902
RAM (Random Access Memory) 903
Hard disk (storage device) 904
Communication interface with an external device 905
Reader/writer capable of reading and writing data stored on a recording medium 907 such as a CD-ROM (Compact Disc Read Only Memory) and the like 908
Input/output interface 909

The information processing device 1 can be realized by a computer connected with these components via a bus (communication line) 906.

The CPU 901 of the information processing device 1 executes a computer program that realizes each of the above described functional units 12 to 15, and thereby the functional units 12 to 15 are realized. Note that the computer program is stored on a readable/writable volatile memory (RAM 903) or a non-volatile storage device such as the hard disk 904 and the like.

Further, a method of supplying a computer program to the information processing device 1 includes, for example, a method of installation on the device via various types of recording media 907 such as a CD-ROM and the like and a method of download from an outside via a communication line such as the Internet and the like. Further, it is also conceivable that a computer program and codes configuring the computer program are configured by the recording medium 907 storing these.

Second Example Embodiment

Hereinafter, a second example embodiment according to the present invention is described. Note that in description of the second example embodiment, the same name portion as a configuration portion configuring the information processing device and the information processing system of the first example embodiment is assigned with the same reference sign, and overlapping description of the common portion is omitted.

Figure 5:
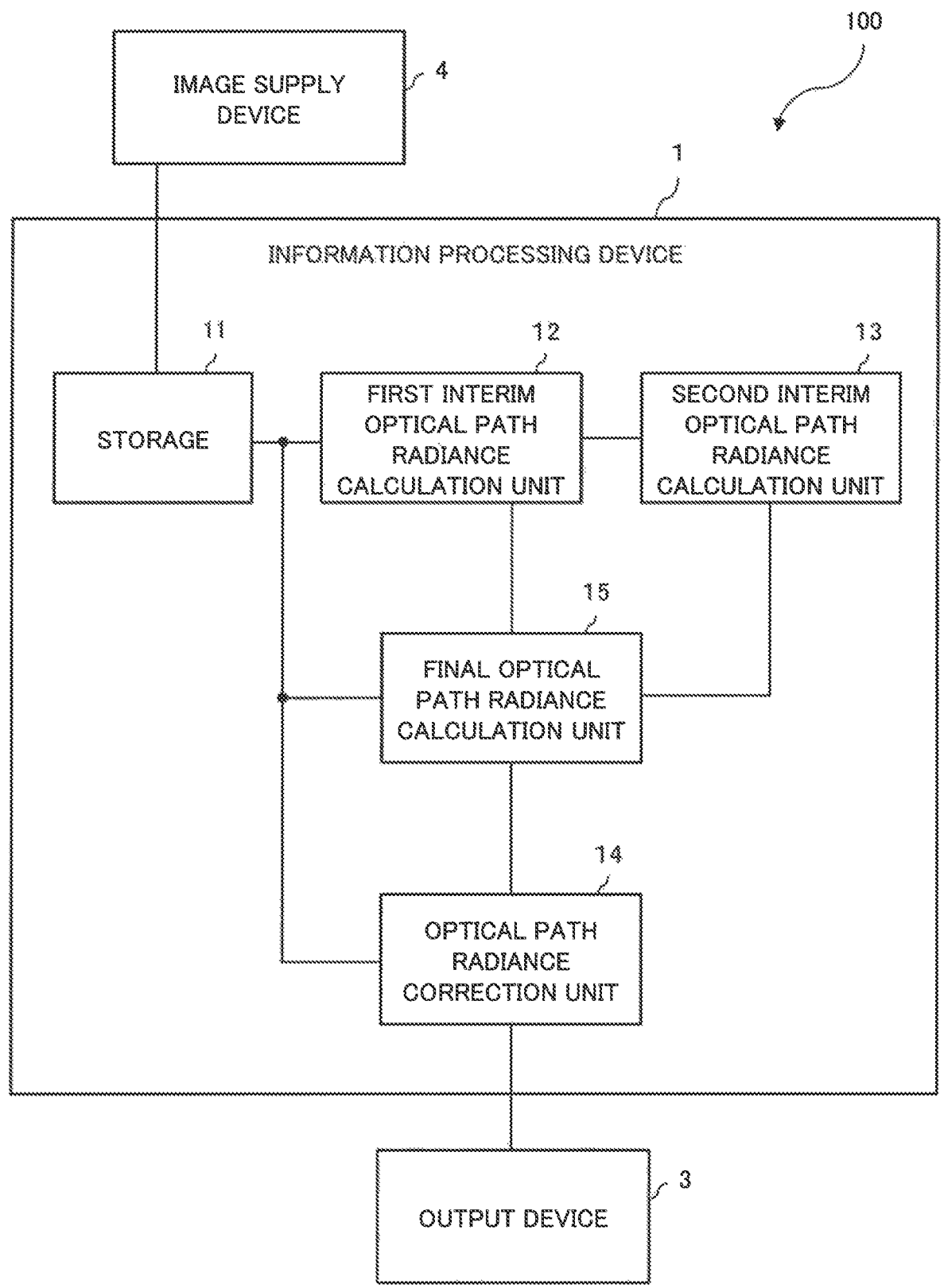
FIG. 5 is a block diagram simply illustrating a configuration of an information processing device and an information processing system of a second example embodiment according to the present invention.

FIG. 5 is a block diagram simply illustrating a configuration of an information processing device and an information processing system according to the second example embodiment.

In the second example embodiment, the image supply device 4 includes, in addition to the function described in the first example embodiment, a function of providing information (observation environment information) representing the observation environment upon observation to the information processing device 1. The observation environment information includes, for example, a solar altitude during observation, an observation date, an observation time, a latitude and a longitude of an observation target area, a geographical feature of the observation target area, a water vapor amount and an aerosol amount in the observation target area, and the like.

A storage 11 stores the observation environment information supplied from the image supply device 4 also in association with the observation image.

A configuration other than the final optical path radiance calculation unit 15 in the information processing device 1 of the second example embodiment is similar to a corresponding configuration of the information processing device 1 of the first example embodiment.

The final optical path radiance calculation unit 15 uses the first interim optical path radiance $\beta^D(\gamma_i)$ according to the first interim optical path radiance calculation unit 12 and the second interim optical path radiance $\beta^E(\gamma_i)$ according to the second interim optical path radiance calculation unit 13. Further, the final optical path radiance calculation unit 15 also uses at least one of the observation image or the observation environment information stored on the storage 11. The final optical path radiance calculation unit 15 calculates the final optical path radiance $\beta^F(\gamma_i)$ based on these pieces of information. For example, the final optical path radiance calculation unit 15 weights and adds the first interim optical path radiance $\beta^D(\gamma_i)$ and the second interim optical path radiance $\beta^E(\gamma_i)$ by using the mathematical equation represented in equation (7), and calculates the result as the final optical path radiance $\beta^F(\gamma_i)$. In equation (7), as described in the first example embodiment, $a(\gamma_i)$ is a weighting coefficient representing reliability for the dark pixel assumption with respect to each observation wavelength band $\gamma_i$.

Specifically, the final optical path radiance calculation unit 15 calculates the dark pixel assumption reliance coefficient by using at least one of the observation environment information or the observation image stored on the storage 11. For example, the final optical path radiance calculation unit 15 determines whether a ground surface area related to each pixel of the observation image associated with each wavelength band $\gamma_i$ includes one or a plurality of specific ground surface objects. Then, the final optical path radiance calculation unit 15 calculates a number of pixels that includes the specific ground surface object, and sets (calculates) the dark pixel assumption reliance coefficient $a(\gamma_i)$ based on the calculated number of pixels or a number in which the calculated number of pixels is subtracted from the total number of pixels of the image. The specific ground surface object is, for example, water, an artificial object, vegetation, soil, or snow.

More specifically, the final optical path radiance calculation unit 15 selects a luminance $Lj(\gamma_R)$ associated with a wavelength band corresponding to red and a luminance $Lj(\gamma_{NIR})$ associated with a wavelength band corresponding to near-infrared, among luminance $Lj(\gamma_1), \ldots Lj(\gamma_N)$ acquired from a j-th pixel in observation images associated with N wavelength bands. Then, the final optical path radiance calculation unit 15 calculates a normalized difference vegetation index Ij by using these selected luminance $Lj(\gamma_R)$ and $Lj(\gamma_{NIR})$ and a mathematical equation represented in equation (8).

$$I_j = \frac{L_j(\gamma_{NIR}) - L_j(\gamma_R)}{L_j(\gamma_{NIR}) + L_j(\gamma_R)} \quad (8)$$

Further, the final optical path radiance calculation unit 15 determines the j-th pixel as a vegetation area when a value of the normalized difference vegetation index Ij is larger than a threshold. The final optical path radiance calculation unit 15 executes such processing for all pixels configuring the observation image, and thereby, calculates a number of pixels of the ground surface area including vegetation, and sets (calculates) the dark pixel assumption reliance coefficient, based on the calculated number of pixels.

Note that the final optical path radiance calculation unit 15 may use, instead of the normalized difference vegetation index, a vegetation index (e.g. SAVI (Soil Adjusted Vegetation Index), RVI (Rate Vegetation Index), NRVI (Normalized Ratio Vegetation Index), TVI (Transformed Vegetation Index), CTVI (Corrected Transformed Vegetation Index), TTVI (Thiam's Transformed Vegetation Index), EVI (Enhanced Vegetation Index), or the like) described in following reference document 2. Further, the final optical path radiance calculation unit 15 may use, instead of the normalized difference vegetation index, a water index (e.g. NDWI (Normalized Difference Water Index)), a soil index (e.g. NDSI (Normalized Difference Soil Index)), NHFD (Non-Homogeneous Feature Difference), or the like described in reference document 3.

[Reference document 2]: Nikolaos G. Silleos, Thomas K. Alexandridis, Ioannis Z. Gitas and Konstantinos Perakis, "Vegetation Indices: Advances Made in Biomass Estimation and Vegetation Monitoring in the Last 30 Years", Geocarto International, Volume 21, Issue 4, 2006

[Reference document 3]: A. F. Wolf, "Using WorldView-2 Vis-NIR Multispectral Imagery to Support Land Mapping and Feature Extraction Using Normalized Difference Index Ratios", May 8, 2012

The final optical path radiance calculation unit 15 sets, as an initial value, for example, the dark pixel assumption reliance coefficient $a(\gamma_i)$ (i=1, . . . N) associated with all observation wavelength bands to be 1. Then, the final optical path radiance calculation unit 15 sets the dark pixel assumption reliance coefficient $a(\gamma_{NIR})$ of a wavelength band $\gamma_{NIR}$ corresponding to near-infrared to be 0, when a number in which the number of pixels of the vegetation area is subtracted from the total number of pixels of an image is smaller than a preset value. Further, there is a case in which pixels of a water area are detected based on a water index, and a number in which the number of pixels of the water area is subtracted from the total number of pixels of an image is smaller than a preset value. In this case, the final optical path radiance calculation unit 15 sets the dark pixel assumption reliance coefficient $a(\gamma_{NUV})$ of the wavelength band $\gamma_{NUV}$ corresponding to near-ultraviolet to be 0. Further, the final optical path radiance calculation unit 15 sets the dark pixel assumption reliance coefficient associated with all observation wavelength bands to be 1, when pixels of an artificial object area are detected and the number of pixels of the artificial object area is larger than a preset value.

Note that the final optical path radiance calculation unit 15 calculates a number of pixels including an area of a shade among pixels of the observation image, by using information of a latitude, a longitude, and an observation date of the observation target stored on the storage 11. Then, the final optical path radiance calculation unit 15 may set the dark pixel assumption reliance coefficient associated with all observation wavelength bands, by using the calculated number of pixels. For example, a lookup table in which a latitude, a longitude, and an observation date are associated with a shade amount is previously provided. The final optical path radiance calculation unit 15 calculates a number of pixels, based on a latitude, a longitude, and an observation date of an observation target and a lookup table stored on the storage 11. Then, the final optical path radiance calculation unit 15 sets the dark pixel assumption reliance coefficient based on the calculated number of pixels. Further, the final optical path radiance calculation unit 15 may set the dark pixel assumption reliance coefficient by using both observation environment information and an observation image stored on the storage 11. The final optical path radiance calculation unit 15, for example, calculates a number of pixels that include a specific ground surface object by using the observation image, and calculates a number of pixels that include the area of the shade by using the observation environment information. Next, the final optical path radiance calculation unit 15 sets the dark pixel assumption reliance coefficient by using both the number of pixels that include the specific ground surface object and the number of pixels that include the area of the shade.

The final optical path radiance calculation unit 15 calculates the final optical path radiance $\beta^F(\gamma_i)$ by using the dark pixel assumption coefficient set as described above, the first interim optical path radiance $\beta^D(\gamma)$, the second interim optical path radiance $\beta^E(\gamma_i)$, and equation (7).

The information processing device 1 and the information processing system 100 of the second example embodiment calculate a final optical path radiance by using the dark pixel assumption reliance coefficient, and thereby can reduce, even when the optical path radiance model includes an error, an influence of the error included in the optical path radiance model and accurately calculate the optical path radiance.

Third Example Embodiment

Hereinafter, a third example embodiment according to the present invention is described. Note that in description of the third example embodiment, the same name portion as a configuration portion configuring the information processing devices and the information processing systems of the first and second example embodiments is assigned with the same reference sign, and overlapping description of the common portion is omitted.

Figure 6:
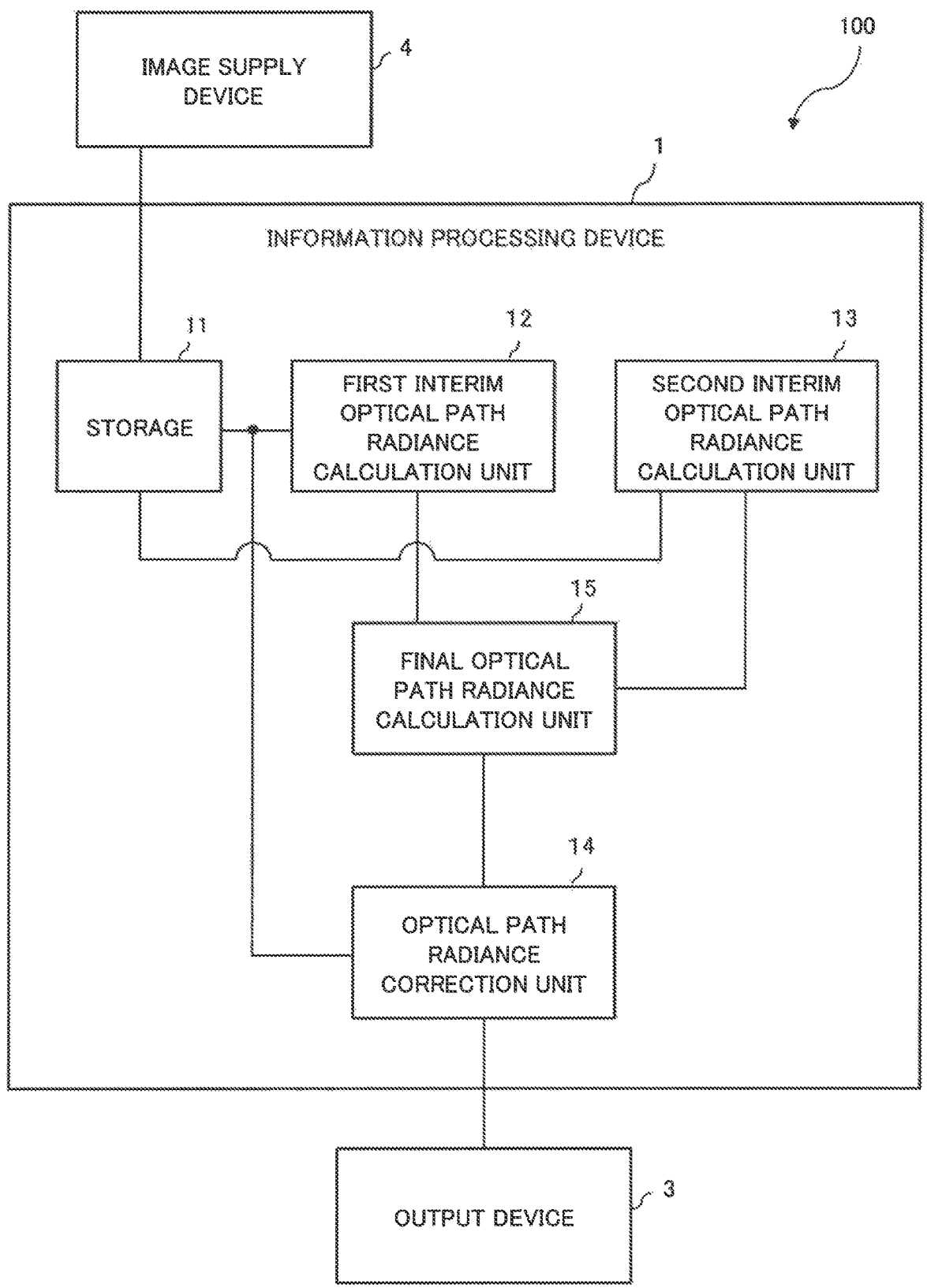
FIG. 6 is a block diagram simply illustrating a configuration of an information processing device and an information processing system of a third example embodiment according to the present invention.

FIG. 6 is a block diagram simply illustrating a configuration of an information processing device and an information processing system according to the third example embodiment.

Also in the third example embodiment, similarly to the second example embodiment, the image supply device 4 provides the observation environment information to the information processing device 1, and the storage 11 stores the observation environment information in association with an observation image.

A configuration other than the second interim optical path radiance calculation unit 13 in the information processing device 1 of the third example embodiment is similar to a corresponding configuration of the information processing device 1 of the first example embodiment.

In the third example embodiment, the second interim optical path radiance calculation unit 13 acquires the observation environment information from the storage 11, and calculates, via simulation, the second interim optical path radiance by using the acquired observation environment information, instead of the first interim optical path radiance. The second interim optical path radiance calculation unit 13 uses, for example, a simulator described in reference document 4.

[Reference document 4]: Daniel Schlapfer, Dr. sc. Nat., ReSe. "MODO User Manual Ver. 5", 2011

The information processing device 1 and an information processing system 100 of the third example embodiment calculate the second interim optical path radiance by considering observation environment information, and thereby can accurately calculate the optical path radiance.

Fourth Example Embodiment

Hereinafter, a fourth example embodiment according to the present invention is described. Note that in description of the fourth example embodiment, the same name portion as a configuration portion configuring the information processing devices and the information processing systems of the first and second example embodiments is assigned with the same reference sign, and overlapping description of the common portion is omitted.

Figure 7:
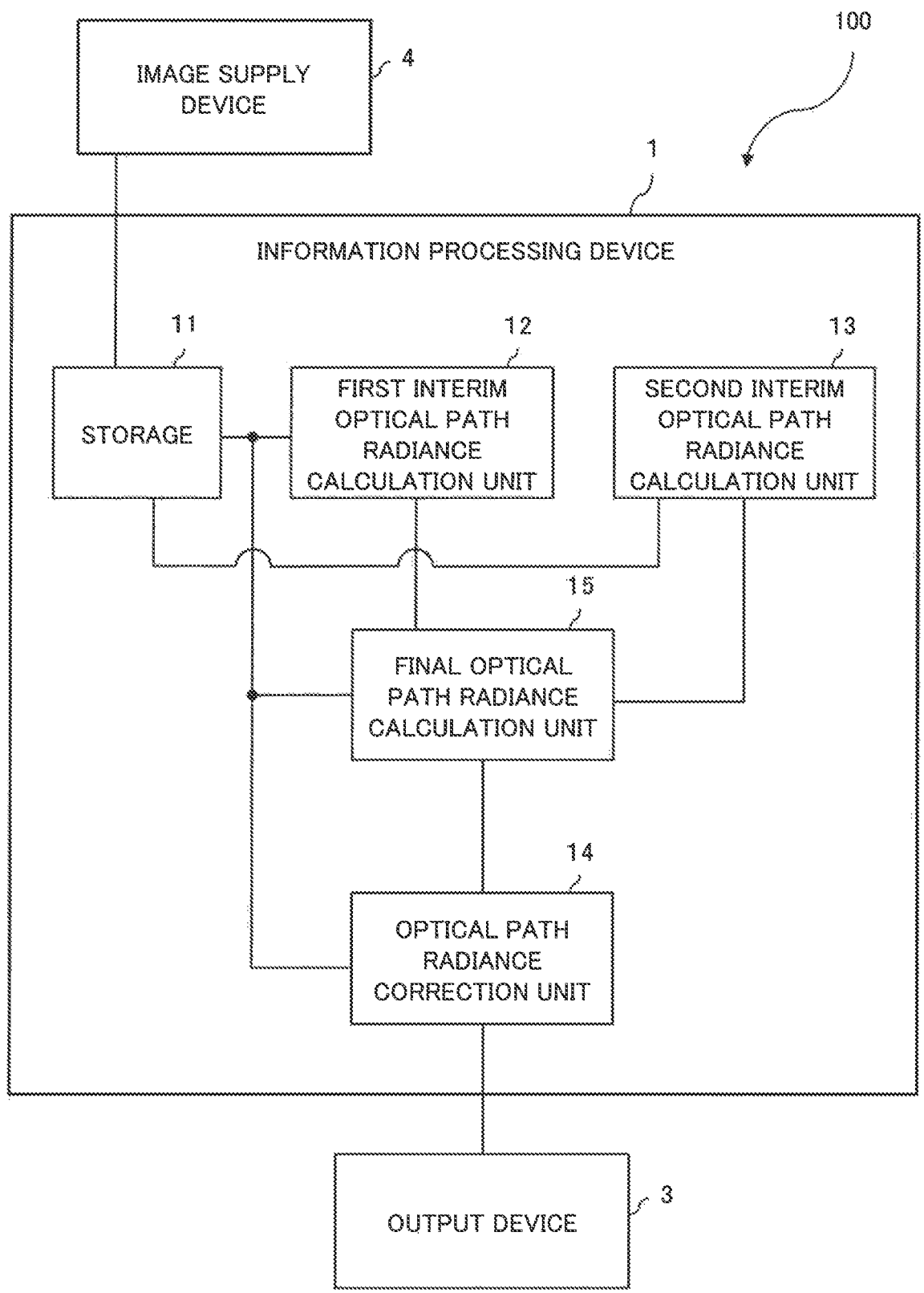
FIG. 7 is a block diagram simply illustrating a configuration of an information processing device and an information processing system of a fourth example embodiment according to the present invention.

FIG. 7 is a block diagram simply illustrating a configuration of an information processing device and an information processing system according to the fourth example embodiment.

A configuration other than the second interim optical path radiance calculation unit 13 and the final optical path radiance calculation unit 15 in the information processing device 1 of the fourth example embodiment is similar to a corresponding configuration of the information processing devices 1 of the first or second example embodiments.

In the fourth example embodiment, the second interim optical path radiance calculation unit 13 acquires the observation environment information from the storage 11, and calculates the second interim optical path radiance by using the acquired observation environment information, instead of the first interim optical path radiance. Further, the final optical path radiance calculation unit 15 calculates the final optical path radiance by considering also the observation environment information acquired from the storage 11.

The information processing device 1 and an information processing system 100 of the fourth example embodiment calculate the final optical path radiance by considering the observation environment information, and thereby can more accurately calculate the optical path radiance.

Another Example Embodiment

Figure 8:
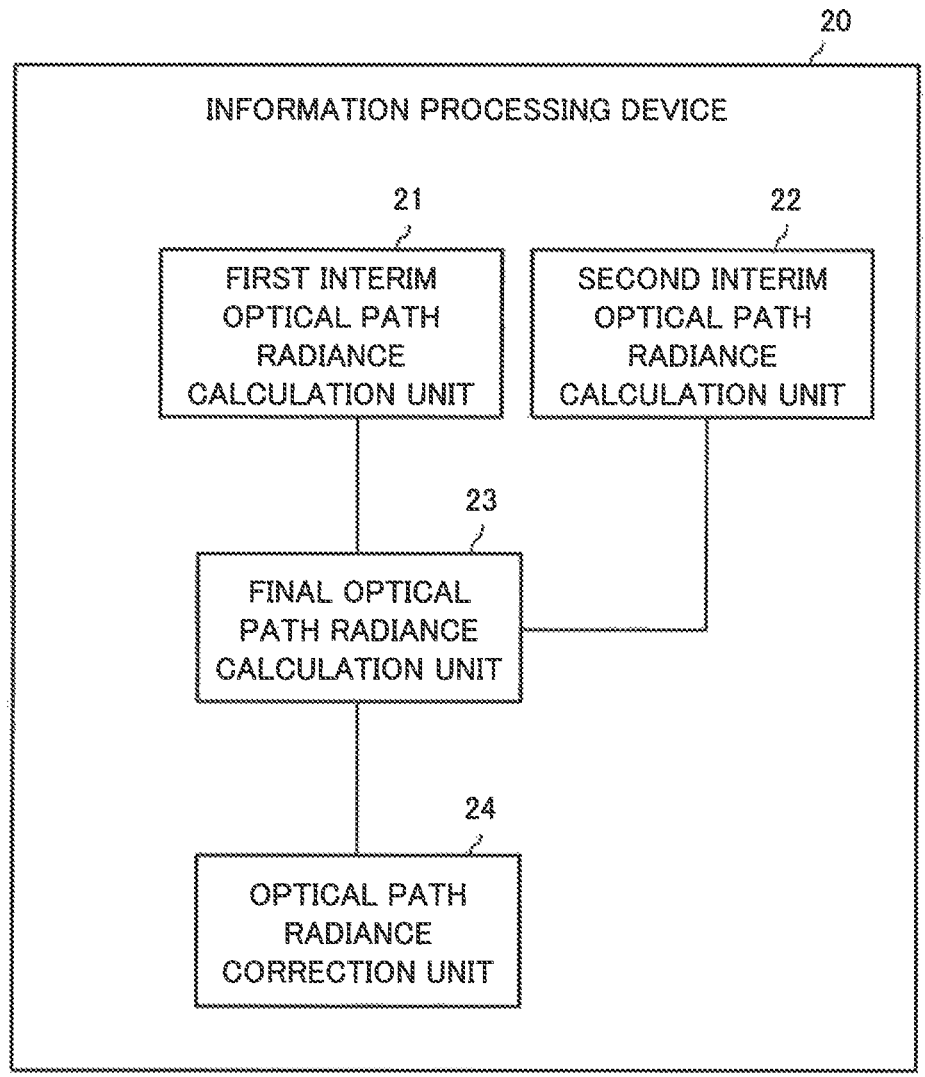
FIG. 8 is a block diagram simply illustrating a configuration of an information processing device of another example embodiment according to the present invention.
Figure 9:
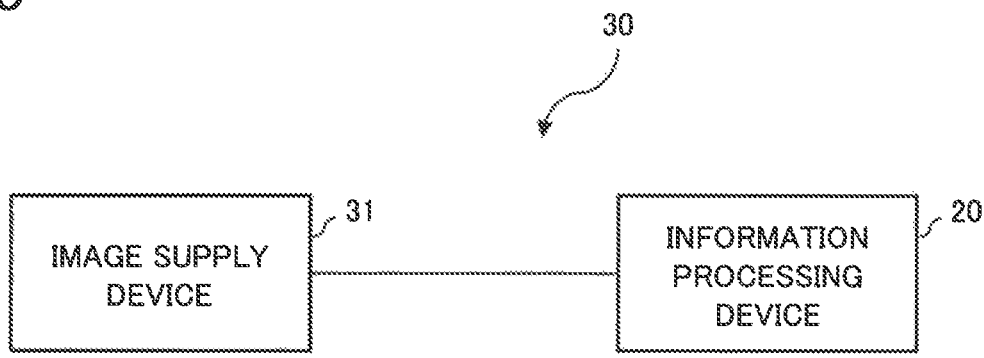
FIG. 9 is a diagram illustrating one example of an information processing system using the information processing device of FIG. 8.

Note that the present invention is not limited to the first to fourth example embodiments and can employ various example embodiments. For example, as another form of the information processing device according to the present invention, a configuration as illustrated in FIG. 8 is employable. An information processing device 20 illustrated in FIG. 8 is connected to an image supply device 31 as illustrated in FIG. 9, and configures an information processing system 30. The image supply device 31 includes a function of supplying, to the information processing device 20, an observation image with respect to each wavelength band acquired by observing electromagnetic waves, having passed through an atmosphere, of a plurality of wavelength bands different from one another.

The information processing device 20 illustrated in FIG. 8 includes a first interim optical path radiance calculation unit 21, a second interim optical path radiance calculation unit 22, a final optical path radiance calculation unit 23, and an optical path radiance correction unit 24.

The first interim optical path radiance calculation unit 21 includes a function of extracting a luminance that satisfies a preset rule, from among luminance that are observed values of electromagnetic waves associated with each pixel constituting the observation image for each wavelength band supplied from the image supply device 31. Further, the first interim optical path radiance calculation unit 21 includes a function of calculating a first interim optical path radiance based on the luminance.

The second interim optical path radiance calculation unit 22 includes a function of calculating a second interim optical path radiance that includes information on a state of an atmosphere.

The final optical path radiance calculation unit 23 includes a function of calculating a final optical path radiance, by using, for each wavelength band, a weighting coefficient representing reliability for an assumption of a dark pixel that is a pixel assumed not to be affected by electromagnetic waves reflected by an object, from among pixels of the observation image, by weighting and adding the first interim optical path radiance and the second interim optical path radiance.

The optical path radiance correction unit 24 includes a function of subtracting the final optical path radiance from all pixels of the observation image for each wavelength band.

The information processing device 20 and the information processing system 30 including the device weight, as described above, the first interim optical path radiance and the second interim optical path radiance, by using the weighting coefficient representing reliability for the assumption of the dark pixel. Then, the information processing device 20 and the information processing system 30 correct the optical path radiance based on the final optical path radiance calculated by using the weighted first interim optical path radiance and the weighted second interim optical path radiance. Therefore, the information processing device 20 and the information processing system 30 can reduce a degree that the first and the second interim optical path radiance having a low degree of reliability for the assumption of the dark pixel are involved in correction of the optical path radiance. Thereby, the information processing device 20 and the information processing system 30 can improve accuracy of optical path radiance correction.

The present invention has been described by using the above-described example embodiments as exemplary examples. However, the present invention is not limited to the above-described example embodiments. In other words, the present invention can be applied with various forms that can be understood by those skilled in the art, without departing from the scope of the present invention.

This application is based upon and claims the benefit of priority from Japanese patent application No. 2016-068541, filed on Mar. 30, 2016, the disclosure of which is incorporated herein in its entirety by reference.

REFERENCE SIGNS LIST

1 Information processing device
3 Output device
4 Image supply device
12 First interim optical path radiance calculation unit
13 Second interim optical path radiance calculation unit
14 Optical path radiance correction unit
15 Final optical path radiance calculation unit

What is claimed is:

1. An information processing device comprising:
a processor that is configured to:
acquire a plurality of observation images corresponding to a plurality of wavelength bands, each observation image having a plurality of pixels capturing an intensity of an observation target within a different wavelength band of the plurality of wavelength bands;
detect, for each observation image, a dark pixel from the plurality of pixels of the observation image in accordance with a preset rule based on a luminance of each pixel of the plurality of pixels, the dark pixel corresponding to a first interim optical path radiance;
for each observation image, calculate a second interim optical path radiance that includes information on a state of the atmosphere at a time at which the plurality of observation images were acquired;
for each observation image, calculate a final optical path radiance by weighting the first interim optical path radiance with a weighting coefficient corresponding to the different wavelength band and adding the weighted first interim optical path radiance to the second interim optical path radiance, the weighting coefficient representing a reliability of the detected dark pixel; and
for each observation image, subtract the final optical path radiance from the plurality of pixels.

2. The information processing device according to claim 1, wherein the processor is further configured to calculate, as the second interim optical path radiance, an optical path radiance in which a cost is minimum, the cost representing a degree of deviation between an optical path radiance calculated by using the information on the state of the atmosphere and the first interim optical path radiance.

3. The information processing device according to claim 1, wherein the processor is further configured to calculate the second interim optical path radiance by simulating an observation environment at a time at which the plurality of observation images were acquired.

4. The information processing device according to claim 1, wherein the processor is further configured to calculate the reliability of the dark pixel by considering at least one of the plurality of observation images and an observation environment at a time at which the plurality of observation images were acquired, and calculates the final optical path radiance by using the calculated reliability as the weighting coefficient.

5. The information processing device according to claim 4, wherein
each of the plurality of observation images is an image of a ground surface, and
the processor is further configured to determine whether a ground surface area related to each pixel of each of the plurality of observation images is an area that includes a specific ground surface object, calculate the weighting coefficient by using a number of the pixels that have been determined as being the area that includes the specific ground surface object, and calculate the final optical path radiance using the calculated weighting coefficient.

6. An information processing method comprising:
by a processor,
acquiring a plurality of observation images corresponding to a plurality of wavelength bands, each observation image having a plurality of pixels capturing an intensity of an observation target within a different wavelength band of the plurality of wavelength bands;

detecting, for each observation image, a dark pixel from the plurality of pixels of the observation image in accordance with a preset rule based on a luminance of each pixel of the plurality of pixels, the dark pixel corresponding to a first interim optical path radiance;

for each observation image, calculating a second interim optical path radiance that includes information on a state of the atmosphere at a time at which the plurality of observation images were acquired;

for each observation image, calculating a final optical path radiance by weighting the first interim optical path radiance with a weighting coefficient corresponding to the different wavelength band and adding the weighted first interim optical path radiance to the second interim optical path radiance, the weighting coefficient representing a reliability of the detected dark pixel; and for each observation image, subtracting the final optical path radiance from the plurality of pixels.

7. A non-transitory program storage medium storing a computer program representing a processing procedure that causes a computer to execute:

acquiring a plurality of observation images corresponding to a plurality of wavelength bands, each observation image having a plurality of pixels capturing an intensity of an observation target within a different wavelength band of the plurality of wavelength bands;

detecting, for each observation image, a dark pixel from the plurality of pixels of the observation image in accordance with a preset rule based on a luminance of each pixel of the plurality of pixels, the dark pixel corresponding to a first interim optical path radiance;

for each observation image, calculating a second interim optical path radiance that includes information on a state of the atmosphere at a time at which the plurality of observation images were acquired;

for each observation image, calculating a final optical path radiance by weighting the first interim optical path radiance with a weighting coefficient corresponding to the different wavelength band and adding the weighted first interim optical path radiance to the second interim optical path radiance, the weighting coefficient representing a reliability of the detected dark pixel; and for each observation image, subtracting the final optical path radiance from the plurality of pixels.

\* \* \* \* \*